L. L. TATUM.
CONTROLLER.
APPLICATION FILED SEPT. 20, 1911.
1,101,669.
Patented June 30, 1914.
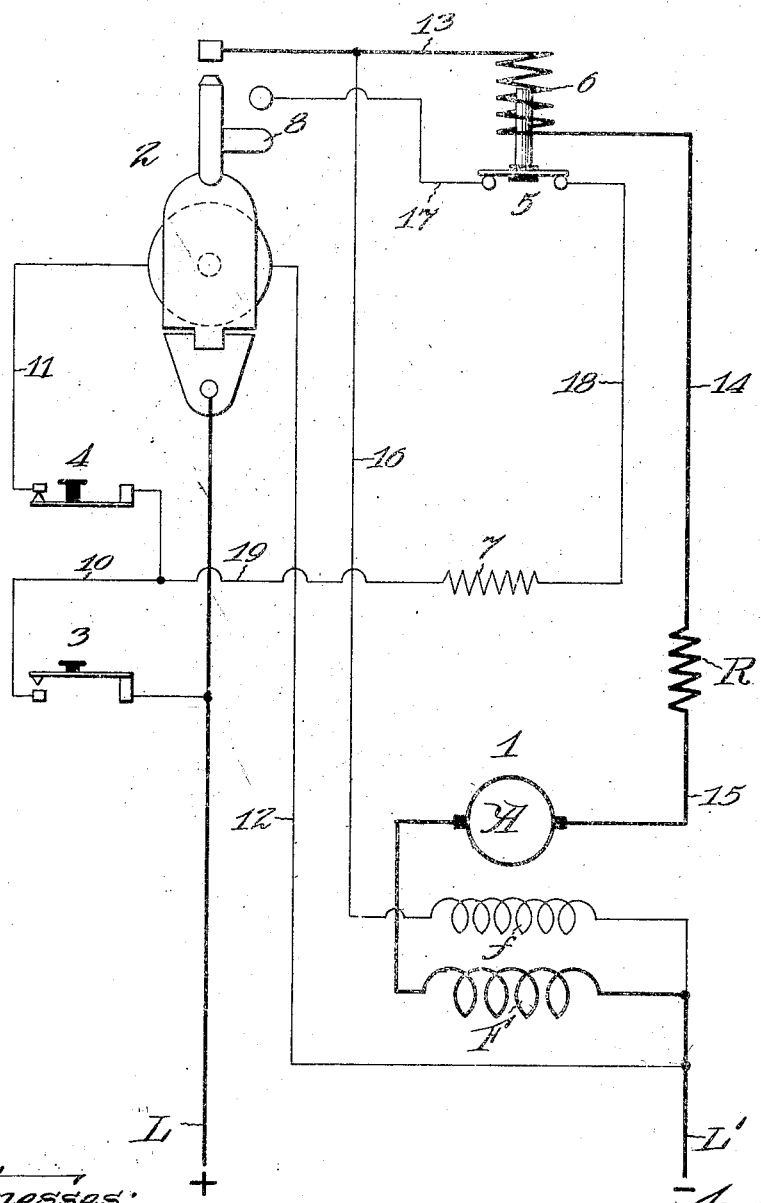
Witnesses:
Geo. Hayman
A. B. Dunbar
Inventor:
Lewis L. Tatum
By Edwin B. Stowe, Jr.
Atty.

UNITED STATES PATENT OFFICE.

LEWIS L. TATUM, OF MILWAUKEE, WISCONSIN, ASSIGNOR TO THE CUTLER-HAMMER MFG. CO., OF MILWAUKEE, WISCONSIN, A CORPORATION OF WISCONSIN.

CONTROLLER.

1,101,669.

Specification of Letters Patent.

Patented June 30, 1914.

Application filed September 20, 1911. Serial No. 650,312.

*To all whom it may concern:*

Be it known that I, LEWIS L. TATUM, a citizen of the United States, residing at Milwaukee, in the county of Milwaukee and State of Wisconsin, have invented new and useful Improvements in Controllers, of which the following is a full, clear, concise, and exact description, reference being had to the accompanying drawing, forming a part of this specification.

My invention relates to improvements in circuit controllers.

It is particularly applicable to controllers for motor circuits, but is not restricted to such application thereof.

In practice there are many instances as in the case of motor driven centrifugal hydro extractors, where it is important for the operator to remain in attendance for a period after closure of the operating circuit, so that he may be on hand if abnormal conditions are met with. In the case of centrifugal hydro extractors, it is essential to the safety thereof, that the material in the basket be properly distributed about its axis so that when the basket is brought up to a critical speed, it will revolve around its true center and not vibrate. If the material is not properly distributed, serious injury is liable to result. Thus, to insure safety of the device, it is highly important that the operator shall remain in attendance until the extractor has reached a fair speed, so that he may immediately stop the driving motor in the case that the device is not properly balanced.

It is one of the objects of my invention to provide a controlling device, which will compel the attendance of the operator until the desired conditions obtain and automatically open circuit in the event that the operator fails to remain in attendance until such time.

My invention has various other objects and advantages hereinafter fully and clearly explained.

For the purpose of disclosing the nature and characteristic features of my invention, I shall describe the controller diagrammatically illustrated in the accompanying drawing which embodies my invention in one form. It should be understood however that my invention is susceptible of embodiment in various other forms and of use in various different relations.

The controller illustrated in the accompanying drawing, is particularly applicable to use in connection with motor driven centrifugal hydro extractors. It might however be used in various other relations.

For the purpose of illustration, I have shown a motor 1 having an armature A, a series field winding F and a shunt field winding $f$. The motor is adapted to be supplied with currents from lines L and L′, through a controlling device, which I shall now describe. This device includes an electro responsive main switch 2 for controlling the continuity of the motor circuit, the motor circuit including a fixed resistance R for protection of the motor. Of course in practice, a variable resistance may be provided if desired and suitable instrumentalities also provided for controlling the same. The operating winding of the switch 2 is adapted to be controlled by push buttons 3 and 4. The button 3 is normally open and is adapted to be closed to energize the switch 2 to start the motor. The push button 4 is normally closed and is adapted to be opened to deënergize the switch 2 to stop the motor.

For maintaining the main switch energized after the release of the push button 3, I provide a switch 5, included in a shunt circuit around said push button 3. The switch 5, is provided with an operating winding 6, connected in series with the motor armature, for a purpose hereinafter described. The shunt circuit includes an economizing resistance 7. In addition to the switch 5, the shunt circuit includes another switch 8, connected to and operable with the main switch 2, whereby the shunt circuit is not closed until the main switch is closed.

I shall now describe the operation of the controller at the same time clearly setting forth the circuit connections therefor. The motor circuit may be closed to start the motor by pressing push button 3. This completes a circuit from main line L through push button 3, by conductor 10, through push button 4, by conductor 11, through operating winding of switch 2, by conductor 12 to main line L′. Switch 2 thereupon responds, closing the motor circuit. The motor circuit current may be traced from main line L through switch 2 by conductor 13, through operating winding of relay switch 5, by conductor 14, through the resistance R, by conductor 15, through the motor armature, thence through the series field winding F to line L'. Closure of the switch 2 also completes a circuit by conductor 16, through the motor shunt field winding $f$ to line L'. The motor is accordingly set in operation, thereby setting in motion the mechanism driven thereby. The relay switch 5 is preferably so designed as to pick up immediately upon the closure of the motor circuit and to remain lifted until the motor has attained a predetermined speed and there has been a consequent predetermined drop in the current flowing in the motor circuit. Thus, practically, simultaneously, with the closure of the maintaining circuit by the auxiliary contact 8 of the main switch said maintaining circuit is opened at another point by the switch 5. Accordingly, under such conditions, should the push button 3 be released, the switch 2 would be deënergized and disconnect the motor from circuit. Thus, while the relay switch 5 is up, it is necessary to manually retain the push button 3 in closed position to maintain the motor in operation. When however, the motor has attained the desired speed, causing a pre-determined drop in the flow of current in the motor circuit, the relay switch 5 will drop, closing the maintaining circuit of the switch 2. This circuit extends from main line L through said switch 2 and its auxiliary switch 8 by conductor 17, through the relay switch 5, by conductor 18, through the resistance 7 by conductor 19, through the closed push button 4 by conductor 11, through the operating winding of switch 2 by conductor 12, to main line L'. This maintaining circuit is in shunt with the push button 3, so that the push button 3 may be now released without deënergizing the switch 2. It will thus be seen that until the relay 5 drops to close the maintaining circuit the starting push button must be manually maintained closed and that if the push button is released before the relay drops, the motor will be automatically disconnected from circuit. It will also be readily seen that this forms a very simple and effective means for compelling the attendance of the operator for the desired period after initially starting the motor and that by adjustment of the relay 5, the period during which the push button 3 must be maintained closed, may be varied at will. To stop the motor, it is only necessary to press the push button 4, which being normally closed and being included in the maintaining circuit, opens said maintaining circuit, thereby deënergizing the switch 2 and disconnecting the motor from circuit.

What I claim as new and desire to secure by Letters Patent is:—

1. In combination, an electro-responsive device, a switch operable to cause said device to respond but tending when released to deënergize said device, and electro-responsive means for preventing said switch from deënergizing said device but necessitating manual retention of said switch for a temporary period after the response of said device.

2. In combination, an electro-responsive translating device, a switch operable to cause said device to be energized but tending to return to a position to cause said device to be deënergized, and electro-responsive means responsive to the electrical condition in the circuit of said translating device to prevent said switch from deënergizing said device but necessitating manual retention of said switch until predetermined electrical conditions are established in the circuit of said translating device.

3. In a controller for electric motors, in combination, a manually operated switch for starting the motor, said switch tending to move to a position to stop the motor, and means operating automatically to render said switch ineffective to stop the motor but necessitating manual retention of said switch for a predetermined period after the motor has been started to compel the attendance of the operator for such a period.

4. In a controller for electric motors, in combination, a switch operable to start the motor but tending when released to stop the motor, and electro-responsive means adapted to prevent said switch from stopping the motor but necessitating manual retention of said switch until predetermined electrical conditions are established in the motor.

5. In a controller for electric motors, in combination, a switch operable to start the motor but tending to move to a position to stop the same, and automatic means for preventing said switch from stopping the motor but necessitating manual retention of said switch until the motor attains a predetermined speed.

6. In a controller for electric motors, in combination, a switch operable to start the motor but tending when released to stop the motor, and electro-responsive means for preventing said switch from stopping the motor but effective only after the motor has attained a predetermined speed.

7. In combination, a motor, a manual switch controlling the continuity of the circuit of said motor and tending to move to a position to cause the motor circuit to be interrupted and electro-responsive means having an operating winding in series with the motor, to prevent said switch from causing interruption of the motor circuit but necessitating manual retention of said switch for a temporary period after the motor is started.

8. In combination, a motor, a manual control switch therefor operable to start said motor but tending to move to a position to stop the same, and an electro-responsive switch responsive to the electrical condition in the motor circuit for short-circuiting said manual switch but only after the establishment of predetermined electrical conditions whereby the manual retention of said switch is necessitated for a temporary period after the motor is started.

9. In combination, a motor, a manual switch controlling the continuity of the circuit of said motor and tending when released to cause the interruption thereof, a shunt circuit around said switch, and an electro-responsive relay controlling said shunt circuit, said relay having its operating winding connected in series with the motor.

10. In a controller for electric motors, the combination with the motor circuit, of an electro-responsive switch controlling the continuity thereof, a manual switch for energizing said electro-responsive switch but tending when released to deënergize the same, a maintaining circuit for said electro-responsive switch, and a relay switch in said maintaining circuit having an operating winding connected in said motor circuit.

11. In a controller for electric motors, the combination with the motor circuit, of an electro-responsive switch controlling the continuity thereof, a manual switch for energizing said electro-responsive switch but tending when released to deënergize the same, a maintaining circuit for said electro-responsive switch, and a relay switch in said maintaining circuit having an operating winding connected in said motor circuit, said relay responding upon closure of the motor circuit to open said maintaining circuit and reclosing the same only after a predetermined decrease of current in the motor circuit.

12. In a controller for electric motors, the combination with the motor circuit, of an electro-responsive switch controlling the continuity thereof, a controlling switch for said electro-responsive switch tending to stand in a position to deënergize the same, a maintaining circuit for said electro-responsive switch including contacts actuated by said electro-responsive switch, and a relay switch in said maintaining circuit having an operating winding connected in the motor circuit.

In witness whereof, I have hereunto subscribed my name in the presence of two witnesses.

LEWIS L. TATUM.

Witnesses:
F. H. HUBBARD,
WALTER E. SARGENT.